US012632244B2

(12) United States Patent
Khatri

(10) Patent No.: US 12,632,244 B2
(45) Date of Patent: May 19, 2026

(54) OVER THE AIR CLOUD SOLUTION

(71) Applicant: Atieva, Inc., Newark, CA (US)

(72) Inventor: Prateek Khatri, Newark, CA (US)

(73) Assignee: Atieva, Inc., Newark, CA (US)

( * ) Notice: Subject to any disclaimer, the term of this patent is extended or adjusted under 35 U.S.C. 154(b) by 265 days.

(21) Appl. No.: 18/660,316

(22) Filed: May 10, 2024

(65) Prior Publication Data

US 2025/0348301 A1 Nov. 13, 2025

(51) Int. Cl.
| | |
|---|---|
| *G06F 8/65* | (2018.01) |
| *B60L 58/12* | (2019.01) |
| *G06F 9/44* | (2018.01) |
| *G06F 9/455* | (2018.01) |
| *H04L 29/08* | (2006.01) |
| *H04W 4/40* | (2018.01) |
| *H04W 4/44* | (2018.01) |

(52) U.S. Cl.
CPC ................ *G06F 8/65* (2013.01); *H04W 4/40* (2018.02)

(58) Field of Classification Search
CPC ......... H04W 4/40; H04W 72/23; H04W 4/50; H04W 12/043; G06F 8/65; G06F 8/654; G06Q 30/0283; H04L 9/50; H04L 9/0894; H04L 9/085; H04L 9/3247; H04L 9/0643
See application file for complete search history.

(56) References Cited

U.S. PATENT DOCUMENTS

| | | | | |
|---|---|---|---|---|
| 9,557,981 | B2 * | 1/2017 | Throop | .................... G06F 8/654 |
| 12,175,233 | B2 * | 12/2024 | Lee | .......................... G06F 8/65 |

| | | | |
|---|---|---|---|
| 2016/0026452 | A1 | 1/2016 | Dani et al. |
| 2018/0013723 | A1 | 1/2018 | Kirk et al. |
| 2019/0354360 | A1 | 11/2019 | Chim et al. |
| 2023/0289158 | A1 | 9/2023 | Sipcic et al. |
| 2024/0061671 | A1 | 2/2024 | Kikuchi et al. |
| 2024/0069896 | A1 | 2/2024 | Ishikawa et al. |

FOREIGN PATENT DOCUMENTS

| | | |
|---|---|---|
| CN | 102368785 A | 3/2012 |
| CN | 117376446 A | 1/2024 |
| WO | 2013/060243 A1 | 5/2013 |

OTHER PUBLICATIONS

International search Report and written opinion received for PCT application No. PCT/US25/24914, mailed on Jul. 14, 2025, 20 pages.

* cited by examiner

*Primary Examiner* — Thuy Dao
(74) *Attorney, Agent, or Firm* — Womble Bond Dickinson (US) LLP

(57) ABSTRACT

In one aspect, a system for supporting over-the-air (OTA) software updates is configured to transmit, over a network, an upload network address for the uploading a packaged computer program, in response to receiving a first request. The system stores an association between the packaged computer program and a UUID. In response to receiving a second request that includes one or more VINs associated with respective one or more vehicles targeted to update software to a specified UUID, the system stores records that associate the one or more VINs with the specified UUID. In response to receiving a third request from a control unit of the vehicle, the system transmits a download network address for the vehicle to use to download the packaged computer program from the file server, when it is determined that the vehicle is associated with one VINs stored in the database.

20 Claims, 7 Drawing Sheets

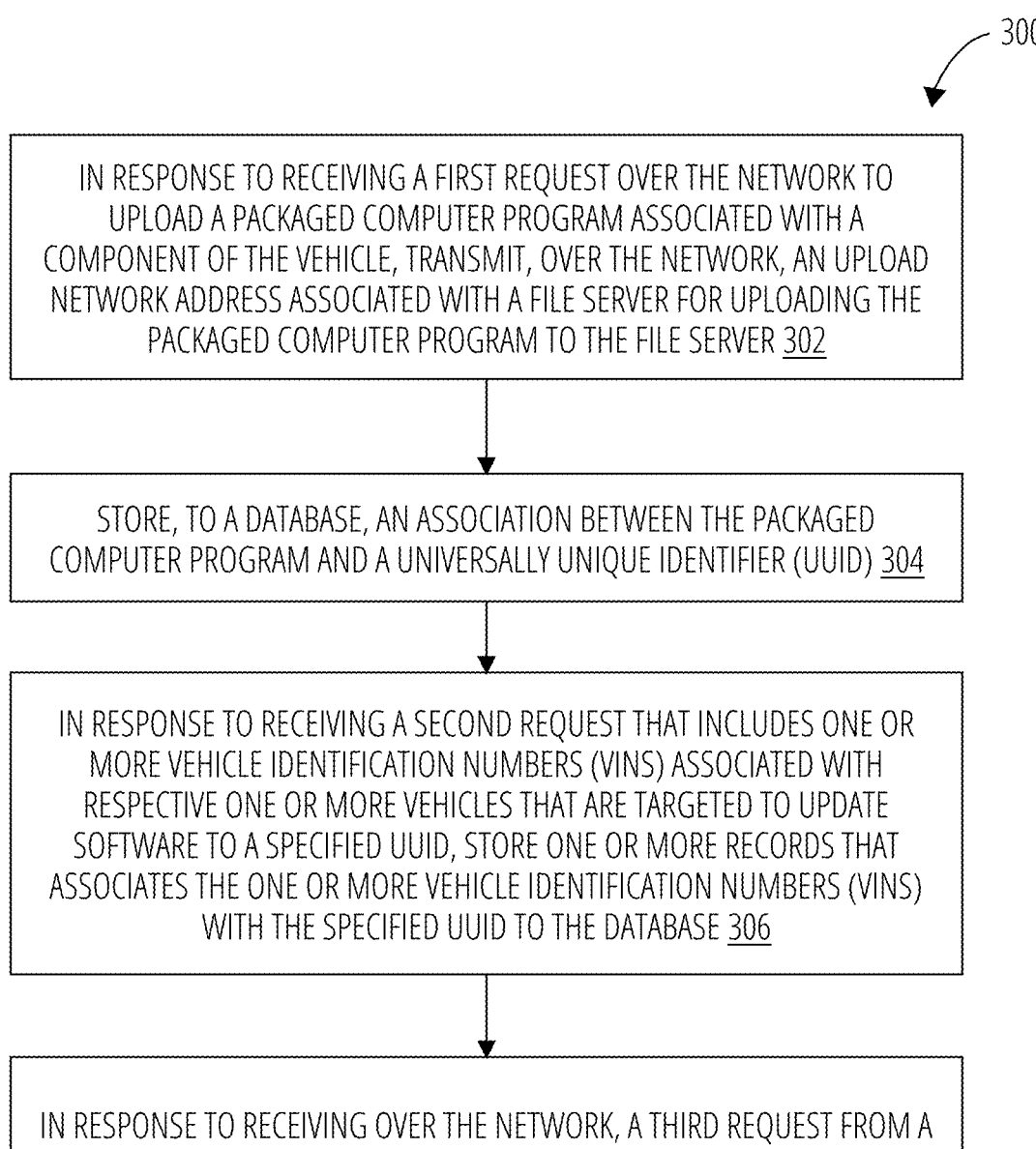

IN RESPONSE TO RECEIVING A FIRST REQUEST OVER THE NETWORK TO UPLOAD A PACKAGED COMPUTER PROGRAM ASSOCIATED WITH A COMPONENT OF THE VEHICLE, TRANSMIT, OVER THE NETWORK, AN UPLOAD NETWORK ADDRESS ASSOCIATED WITH A FILE SERVER FOR UPLOADING THE PACKAGED COMPUTER PROGRAM TO THE FILE SERVER 302

STORE, TO A DATABASE, AN ASSOCIATION BETWEEN THE PACKAGED COMPUTER PROGRAM AND A UNIVERSALLY UNIQUE IDENTIFIER (UUID) 304

IN RESPONSE TO RECEIVING A SECOND REQUEST THAT INCLUDES ONE OR MORE VEHICLE IDENTIFICATION NUMBERS (VINS) ASSOCIATED WITH RESPECTIVE ONE OR MORE VEHICLES THAT ARE TARGETED TO UPDATE SOFTWARE TO A SPECIFIED UUID, STORE ONE OR MORE RECORDS THAT ASSOCIATES THE ONE OR MORE VEHICLE IDENTIFICATION NUMBERS (VINS) WITH THE SPECIFIED UUID TO THE DATABASE 306

IN RESPONSE TO RECEIVING OVER THE NETWORK, A THIRD REQUEST FROM A CONTROL UNIT OF THE VEHICLE, DETERMINING THAT THE VEHICLE IS ASSOCIATED WITH ONE OF THE ONE OR MORE VINS STORED IN THE DATABASE, AND TRANSMITTING TO THE VEHICLE, A DOWNLOAD NETWORK ADDRESS FOR THE VEHICLE TO USE TO DOWNLOAD THE PACKAGED COMPUTER PROGRAM FROM THE FILE SERVER. 308

FIG. 3

OVER THE AIR CLOUD SOLUTION

FIELD

Embodiments disclosed relate generally to automobile technology, and more particularly, to a cloud-based solution for performing over-the-air (OTA) software and firmware updates for a vehicle.

BACKGROUND

Over-the-air (OTA) programming is a computer-based system that transmits computer programs (e.g., a package of installable software or firmware) or configuration changes over a computer network, which may include a mobile or cellular network. OTA solutions may include a variety of network-connected devices that work together to automatically update firmware (FOTA), software (SOTA), configurations files, encryption keys, etc. A vehicle can include a variety of electronic devices that perform machine instructions (e.g., firmware or software), and a manufacturer or management of a vehicle (or fleet of vehicles) may wish to update the firmware or software of these devices from time to time. Given the sheer number of vehicles that may be supported, and the number of devices on each vehicle, issues arise to efficiently deploy updates to vehicles OTA while maintaining an accurate record of the current state of software on each vehicle.

SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In some embodiments, a system (e.g., one or more computers) in communication with a network is configured to support OTA (SOTA, FOTA, etc.) for a fleet of vehicles. The system, which may be referred to as OTA cloud application, is configured to receive a first request over the network to upload a packaged computer program associated with a component of the vehicle. In response to this first request, the OTA cloud application transmits to the requestor, an upload network address. The upload network address may be a uniform resource locator (URL) or other network address that is associated with a file server for uploading the packaged computer program to the file server. This first request may be referred to as an upload request. The system stores to a database, an association between the packaged computer program and a universally unique identifier (UUID). The UUID may be referred to as a package ID and uniquely identifies each uploaded package.

In response to receiving a second request that includes one or more vehicle identification numbers (VINs) associated with respective one or more vehicles that are targeted to update software to a specified UUID, the system stores one or more records that associates the one or more vehicle identification numbers (VINs) with the specified UUID to the database. This second request may be referred to as a deployment request or an update campaign request.

In response to receiving a third request from a control unit (e.g., a telematics control unit) of the vehicle, the system transmits to the vehicle, a download network address (e.g., a URL or other network address) for the vehicle to use to download the packaged computer program from the file server. This may be performed in response to determining that the vehicle is associated with one of the one or more VINs stored in the database. Otherwise, if this vehicle is not associated with one of the one or more VINs stored in the database, the system may respond to the vehicle with an indicator that there are no available updates for that vehicle. Each of the upload URL and download URL may be different pre-signed single-use URLs which are used to access the file server, which may not otherwise be accessible.

In an embodiment, the system may comprise a microservices application formed from a plurality of services that operate asynchronously and independently of each other. Each service may have dedicated compute resources and are independently buildable, deployable and updateable. As described in further detail in other sections, a first service may handle the first request and support uploading of a packaged computer program (e.g., firmware or software) by providing the upload network address to perform the upload, while storing metadata related to this upload which tracks the target device, version, and package identifier (e.g., a UUID) for a given upload. A second service may handle a deployment campaign to target one or more vehicles for a specified package. And a third service may be a single interface point for a vehicle looking to perform an update. Additional domain specific operations of each microservice are described further in other sections.

In an embodiment, the packaged computer program may include an indication to the control unit to obtain a second packaged computer program for updating programming of the control unit (in alternative to or in addition to updating other devices in the vehicle). The system (e.g., a microservices application) may include a dedicated image server that receives, from a build server, a delta computer program of the control unit of the vehicle, and stores the delta computer program in a filesystem tree such as an OStree repository. In response to receiving a request from the control unit of the vehicle, the file tree system may transmit the one or more delta builds of the control unit, to update the control unit to a target version. Other technical features may be readily apparent to one skilled in the art from the following figures, descriptions, and claims.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIG. 3 shows a flow diagram of a process for providing OTA updates to a vehicle, in accordance with an embodiment.

DETAILED DESCRIPTION

Figure 1:
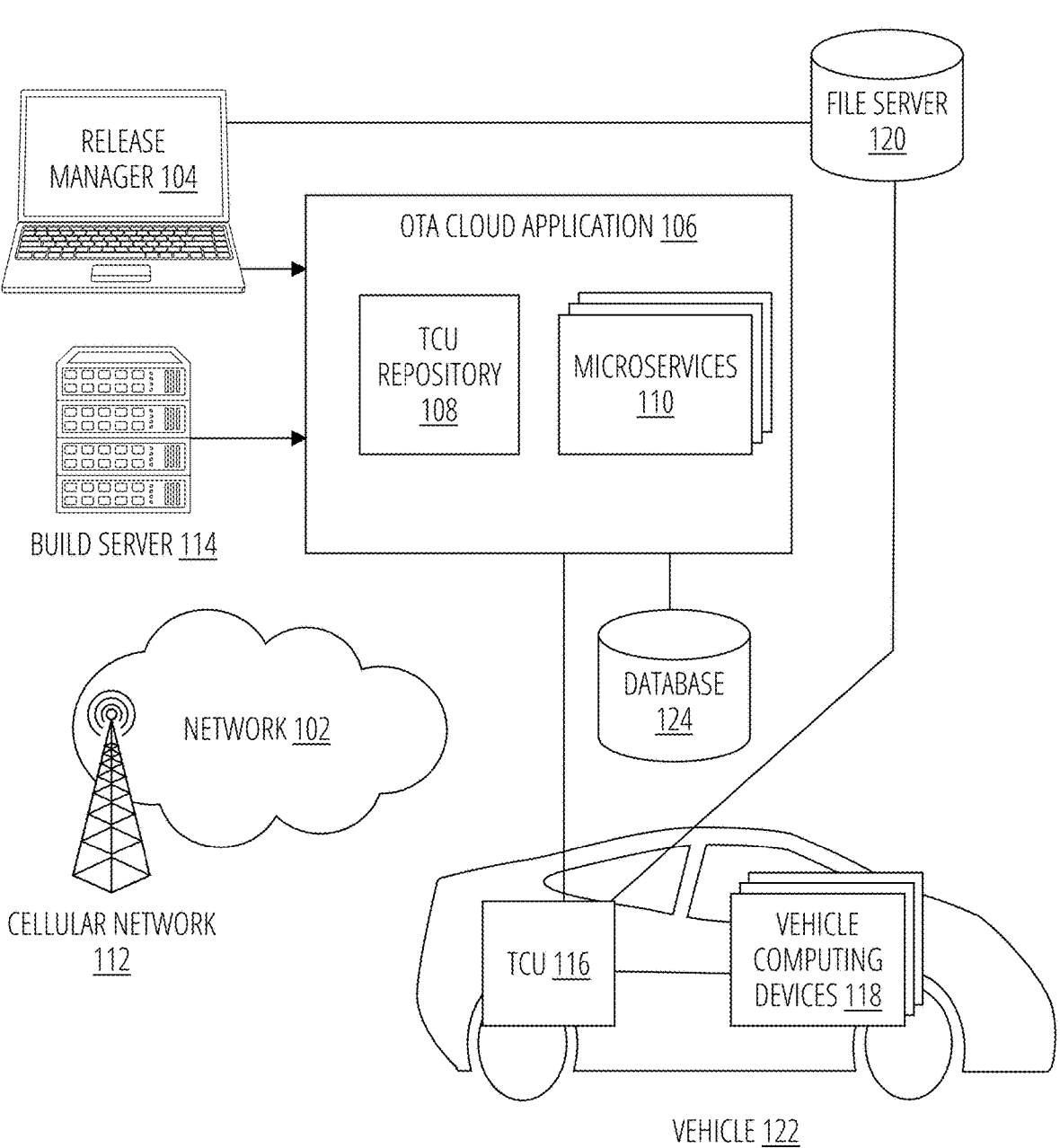
FIG. 1 shows an example of an OTA cloud application, in accordance with an embodiment.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "transmitting", "storing", "determining", "accessing", "referencing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

OTA updates to vehicles may support software updates for infotainment and navigation systems, and in rarer cases, updates to vehicle drive controllers (e.g., sensors, actuator controllers, signal processing systems, etc.). Infotainment updates may refresh map information, upgrade audio functionality, improve user interfaces, streaming applications, and add or modify other application-level functionality. Drive control OTA relates to updating vehicle controllers that affect operation or driving of the vehicle. These updates may include system enhancements or fixes for vehicle specific systems such as, for example, the vehicle powertrain (e.g., propulsion, steering), chassis systems, brakes, battery management, or other vehicle control functionality.

Traditional OTA system for vehicles have drawbacks relating to scalability-a fleet of vehicles may grow over time, and traditional systems lack flexibility to grow abilities without extensive overhaul and rebuilding of such a system which may result in extended downtime of the OTA system. Further, traditional OTA systems may lack reliability due to imprecise data management techniques that may not be accurately track OTA updates for a fleet of vehicles on a per-vehicle per-controller basis. Further, traditional OTA systems may be subject to security vulnerabilities.

Aspects of the present disclosure describe a method and system that provides a robust, extensible, efficient, and secure OTA solution for a fleet of vehicles. Such a method and system addresses such issues by leveraging a unique microservices architecture and implementing database management with specific services to reduce or eliminate inter-service communication between the microservices.

A sophisticated OTA update delivery system is disclosed that is designed specifically for managing a fleet of vehicles. The system may utilize microservices, which are small, independently deployable units of functionality, to manage various aspects of the update process. These microservices are finely tuned to handle specific tasks efficiently, allowing for seamless coordination and execution of updates across an entire fleet of vehicles. The system includes integration of domain specific features, which are granular functionalities within each microservice. These functionalities enable a client (e.g., a manufacturer or manager of a fleet of vehicles) to have fine-grained control over the update process, providing precise targeting of vehicles and vehicle components for updating, thereby minimizing downtime and optimizing resource utilization. As described further herein, the system implements a unique approach to database management within the OTA update ecosystem. By intelligently structuring and querying a database rather than relying on traditional inter-process communication, the microservices application can efficiently store, retrieve, and manage the vast amount of data associated with OTA updates. This promotes rapid access to update packages, configuration settings, and vehicle-specific information, thereby enhancing the overall efficiency and reliability of the update process. Another feature of the system is the optimized routes through which vehicles and clients communicate with the update system. The system includes dedicated pathways (e.g., API endpoints for uploading updates, deploying an upload campaign, and communicating with vehicles) and intelligent routing algorithms that reduce latency and network congestion while enhancing the responsiveness of the update delivery process.

FIG. 1 shows an example of an OTA cloud application, in accordance with an embodiment. Various components such as release manager 104, file server 120, OTA cloud application 106, build server 114, telematics control unit (TCU) 116, and vehicle computing devices 118 each represent one or more computing devices, which may be communicatively coupled over a computer network 102.

Network 102 may comprise transmitters, receivers, network switches, routers, firewalls, cables, etc. Network 102 may include a wide area network (WAN), a local area network (LAN), and/or the public internet. Network 102 may include one or more cellular networks 112 such as a second generation (2G) cellular network, global system telecommunications (GSM), long-term evolution (LTE), new radio (NR), or another cellular network. Generally, each of the computing devices or components thereof described in the present disclosure may communicate with each other over network 102 using one or more communication protocols such as, for example, transmission control protocol/internet protocol (TCP/IP), a cellular network protocol, or other communication protocol.

Release manager 104 represents a client device that may operate a user interface (e.g., a website or standalone application) that performs application programming interface (API) calls to the OTA Cloud Application 106 to perform actions related to uploading software packages for one or more vehicles, deploying update campaigns, and monitoring vehicle update status. Release manager 104 may represent multiple different clients (different computing devices operated by different users at different times) to perform these actions of uploading, deploying, or monitoring.

Build server 114 may implement a suite of plugins that support continuous delivery pipelines for updating software or firmware of the telematics control unit (TCU). The pipeline may include automated building, release, and tracking of software releases. The TCU build server may build and push a TCU software image to a TCU repository 108.

Vehicle 122 may comprise one or more onboard computing devices such as TCU 116 and one or more vehicle computing devices 118. TCU 116 is an electronic control unit (ECU) of vehicle 122 that is responsible for delivering OTA updates to each of the other computing devices 118 in the vehicle 122. Vehicle computing devices 118 may represent non-vehicle control devices (e.g., infotainment) and/or vehicle control devices (e.g., actuator controllers, etc.). The TCU 116 communicates with OTA cloud application 106 to performing the software or firmware flash on all the updatable components 118 in the vehicle 122. TCU 116 may download each of the updates, verify each update (e.g., by performing a hash on the downloaded package and comparing that hash with metadata associated with the package), and distribute the verified software images to all updatable components in the vehicle. TCU 116 may use diagnostics over internet protocol (DoIP) or unified diagnostics services (UDS) protocol to communicate with all the targeted vehicle computing devices 118 to update those devices. TCU may report the status of the update to a vehicle user through a human machine interface (HMI) such as a vehicle display or a mobile application during update. The TCU may also report the status of the updates (e.g., whether ongoing, complete, or failed) to the OTA cloud application 106.

In some cases, the TCU 116 may need to be update its own software or firmware. In such a case, TCU 116 may download the TCU image (which may be one or more delta builds) from TCU repository 108. The TCU repository 108 may comprise a filesystem tree such as an OSTree repository server. The TCU repository 108 may be deployed as part of the OTA cloud application 106. TCU repository 108 may give the TCU access to push and pull update images for the TCU. The filesystem tree architecture of the TCU repository allows delta updates to take place on the TCU while saving bandwidth of network 102 and reducing update time. Details are described further in other sections.

OTA cloud application 106 may comprise microservices 110. Microservices—also known as the microservice architecture—is computer software architecture that includes a collection of services that may be independently buildable, updateable, and deployable, but work together to perform related functionality to one or more clients (e.g., release manager 104 and vehicle 122). The microservice architecture enables an organization to deliver large, complex applications rapidly, frequently, with reduced downtime of the application. Each service of the microservices 110 may perform domain specific operations to efficiently distribute the load and isolate the vehicle communication, as described in other sections in detail.

Generally, OTA cloud application 106 may receive a first request over the network 102 to upload a packaged computer program associated with a component of the vehicle. This first request may be received from release manager 104, and may be referred to as an upload (UL) request. In response, the OTA cloud application 106 may transmit back to the release manager 104, over the network, an upload network address (e.g., a pre-signed URL) associated with file server 120. This URL may be a single-use URL. The release manager 104 may upload the packaged computer program to the file server at the provided upload network address.

OTA cloud application 106 may store, to a database 124, an association between the packaged computer program and a universally unique identifier (UUID). OTA cloud application 106 may use this UUID to uniquely identify and reference each packaged computer program (now stored on the file server 120).

OTA cloud application 106 may receive a second request over the network (e.g., from release manager 104). This second request may be referred to as a campaign deployment request or update campaign request, and may include one or more vehicle identification numbers (VINs) and one or more UUIDs. The VINs are associated with respective one or more vehicles that are targeted to update software to the specified UUID. In response to receiving the second request, OTA cloud application 106 may store one or more records that associate the one or more vehicle identification numbers (VINs) with the specified UUID to the database 124. The one or more records may include a campaign record that includes all the VINs in the request and the specified UUID, and individual vehicle records associated with each of the VINs in the request, as described further in other sections.

OTA cloud application 106 may receive a third request from TCU 116 of vehicle 122. This request may be referred to as a poll from the vehicle, to request whether an update is available and for any of the computing devices 118 (including the TCU 116) on the vehicle 122. In response to receiving this third request, OTA cloud application 106 may determine whether the vehicle 122 is associated with one of the one or more VINs stored in the database 124, for example, by parsing the stored one or more records. In response to determining that the vehicle is associated with one of the one or more VINs stored in the database indicating that there is an active campaign to deploy a package to that vehicle, OTA cloud application 106 transmits a download network address (e.g., a URL or other network address) for the vehicle to use to download the packaged computer program from the file server 120.

The handling of the first request, the second request, and the third request may be performed by respective services of microservices 110. Further, intercommunication between the services may be reduced or eliminated by using the database 124 and stored package metadata (e.g., UUID, hash value, package size, package name) and stored vehicle information (e.g., VINs, vehicle records, and campaign records) in place traditional inter-service communication, which may reduce operational cost and overhead. Aspects described also allow for software update packages to be distributed from to the vehicle using region specific file servers, and provides functionality for campaign queuing, campaign aborting, and download resuming, as described further in other sections.

Figure 2:
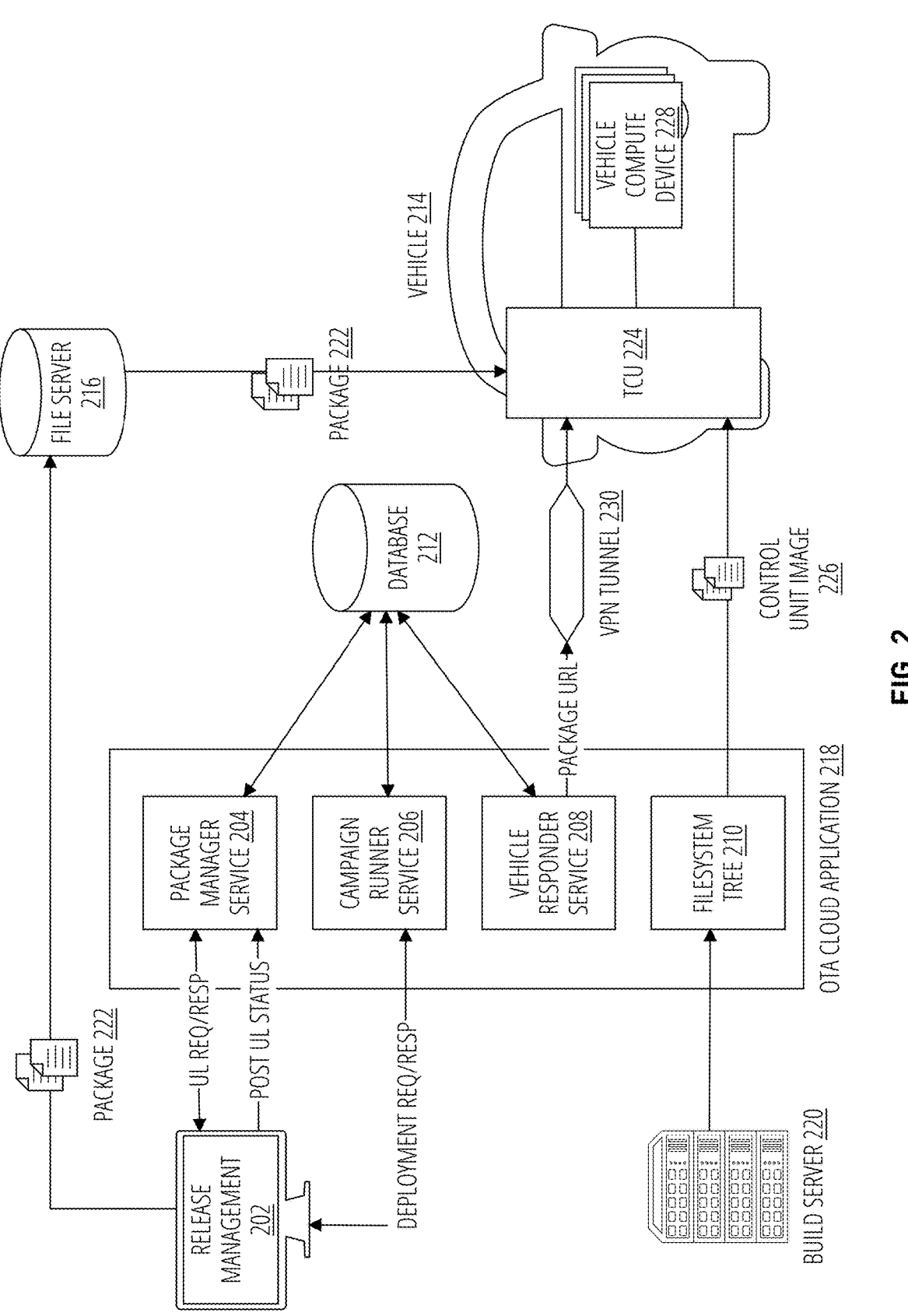
FIG. 2 illustrates an example of an OTA cloud application having a microservices architecture with dedicated OTA operations, in accordance with an embodiment.

FIG. 2 illustrates an example of an OTA cloud application having a microservices architecture with dedicated OTA operations, in accordance with an embodiment. Details described with respect to one figure may correspond to or be applicable to other figures. For example, OTA cloud application 218 may correspond to OTA cloud application 106, and vice versa.

OTA cloud application 218 may interact with release management 202, TCU 224, and build server 220 to provide OTA functionality to a fleet of vehicles such as vehicle 214. OTA cloud application may comprise a plurality of services that form a microservices application. The plurality of services may include a package manager service 204, a campaign runner service 206, and a vehicle responder service 208.

Interaction between the microservices 204, 206, and 208 do not follow traditional inter-service communication with traditional mechanisms, but instead, use a database 212 to coordinate operations performed by each microservice. Each microservice performs domain specific operations that can be acted on in response to reading and examining database 212. In an example, database 212 comprises a relational database (e.g., one or more tables of columns and rows with a unique key identifying each row). Each row may also be referred to as a record. In an example, database 212 may comprise a PostgreSQL database or other relational structured query language (SQL) database.

Generally, package manager service 204 performs operations relating to packaged computer programs (e.g., package 222) such as handling requests, validating a requested upload, and providing the upload network address to the release management 202. Campaign runner service 206 performs operations relating to handling deployment of updates to vehicles, such as handling campaign deployment requests, managing status of each requested update from a campaign perspective (e.g., based on a campaign record) and from a vehicle perspective (e.g., based on the vehicle records and vehicle record queues). Vehicle responder service 208 performs operations relating to interfacing with each of the vehicles, provisioning available packaged computer programs to vehicles, and updating status of each requested update. With the three microservices having clear domain separation and reduced or eliminated inter-process communication, OTA cloud application 218 operates with high efficiency and scalability.

Package manager service 204 receives upload requests from release management 202. The upload request may be performed by release management 202 through an API call. The request may indicate an intent to upload a packaged computer program (e.g., firmware or software), or to view status of an existing software package, and/or to delete uploaded packages. In the case of a request to upload a package, the request may include information such as an upload region, a filename, a version, a file size (e.g., number of bytes) of the upload, a chunk parameter, a hash value of the package to be uploaded, and one or more tags. In an embodiment, the request must include all of these items or the package manger service 204 rejects the request.

The upload region may indicate a region in which the file server 216 is located. For example, multiple file servers may be deployed to different regions to service vehicles in a given region. If an update is targeted to vehicles in a particular region (e.g., a country, a continent, a county, etc.) that is specified by release management 202, package manager service 204 may select a corresponding file server 216 in that region to reduce latency when the vehicles pull the package. The file name may be a string of symbols (e.g., letters, numbers, etc.) associated with the file that the release management 202 is to upload. The version number may be a string of symbols representing a version of a particular software for a particular computing device. File size may be the number of bytes of the package to be uploaded. Chunk size may be a number of bytes that portions of the file are to be divided into for upload. This size should be less than the file size, however, if file size and chunk size are specified as the same in the request, package manager service 204 treats the upload as a single complete file and provides a single upload network address. The number of chunks may be calculated as: file size in bytes/chunk size in bytes. The hash value may comprise a SHA256 hash value of the package. The SHA256 sum may be calculated by release management 202 (or a user operating release management 202) using a SHA256 hashing algorithm. Tags may include additional metadata that the user of release management 202 wishes to attach to a give package. Before the above fields are calculated, release management 202 digitally signs the package using a digital certificate (e.g., public key infrastructure (PKI) certificate or other encryption certificate). This allowed the TCU 224 on the vehicle 214 to verify the signature before utilizing the package.

The package manager service 204 receives the upload request from release management 202 and validates the request (e.g., by verifying that the filename is unique and that the required fields (e.g., file name, file size, hash value, region, etc.) are provided. In response to validating the request, package manager service 204 returns the response with a single upload network address (for a file that is uploaded as a whole) or multiple network addresses (for each chunk of a chunked file). The package manager service 204 generates the upload network address for a specified file server 216. In an embodiment, each provided network address for upload is a pre-signed URL. A pre-signed URLs is a URL with short-term access to a private object (a portion of memory or 'bucket' in file server 216). The pre-signed URL may be generated by appending security parameters to the URL which allows the release manager 202 to use the pre-signed URL under specified conditions such as, for example, a single use condition. In such a case, file server 216 will receive package 222 through the pre-signed URL and that pre-signed URL is no longer valid after that single use.

Release management 202 uses the upload network addresses to upload the package 222 or parts of the package 222 to file server 216. Upon completion of the upload, release management 202 may post the upload status to the package manager service 204 indicating that upload is complete. Once the file or all parts of the file are uploaded, the uploaded package can then be used for campaign deployment.

Package manager service 204 may generate a UUID (Universally unique identifier) in response to receiving the upload request, and associate this UUID with the corresponding upload metadata (e.g., the file name, file size, hash value, region, etc.). Package manager service 204 includes API endpoints for clients (e.g., release management 202) to query package information. Clients may track and view package information through query requests to package manager service 204, which may be based on file name or UUID. Clients may also use the API endpoints to transmit a request to cancel an already uploaded package by specifying the package name or UUID to be canceled. In response, package manager service 204 may update the database for a given UUID to indicate that the specified package is canceled and to not deployed or downloaded by a vehicle. This indicator may be used by campaign runner service 206 as an indicator to determine that this package is not to be included in an update campaign. Package manager service 204 may store or update the package metadata (e.g., file fields, the UUID, cancel indicator) in database 212 and retrieve this information upon request (e.g., in response to a query request from release management 202).

The campaign runner service 206 handles launching, aborting, queuing, and monitoring status of update campaigns. Campaign runner service 206 may include one or more API endpoints to receive a request to launch an update campaign. An update campaign is an initiative to deploy a select uploaded package to one or more vehicles. The release management 202 may provide, in the deployment request, one or more VIN numbers associated with vehicles targeted for that update, and a UUID matching one that was uploaded to a file server. The one or more VINs target those vehicles that are to download and install the package to an onboard vehicle compute device 228. In some cases, a deployment request may specify multiple UUID (e.g., a bundle of UUIDs) for a particular campaign. The deployment request may further include a name, a description, and one or more tags, each of which will be stored by campaign runner service 206 and associated with a given campaign in database 212. Campaign runner service 206 may validate all required fields (e.g., VINs provided match existing known VINs, UUID provided matches existing known UUIDs of uploaded and non-canceled packages). Once validated, campaign runner service 206 may launch the requested deployment request by storing one or more records (e.g., a campaign record and vehicle records) in database 212. Campaign runner service 206 may return the status of the campaign to the release manager 202 initially as "active" which denotes the roll-out has started. Campaign runner service 206 may generate multiple records by first generating a single campaign record, and unpacking that campaign record into a corresponding vehicle record for each named vehicle in that campaign record. This is described further in other sections such as with regard to FIG. 6.

Campaign runner service 206 may handle a request to pause or cancel a given campaign. For example, after an update campaign has already launched, features of that update may be discovered as undesirable or defective. Campaign runner service 206 may receive a request from a release management 202 to pause or cancel a specified campaign (e.g., by campaign name, package name, and/or package UUID). Campaign runner service 206 may examine the one or more records in database 212 to determine whether any of the vehicles in a given campaign have queried for a respective vehicle record and, if not, campaign runner service may cancel or pause the campaign. Paused campaigns may be resumed by user request. If all the VINs in the VIN List provided for the campaign have not queried the server for their respective vehicle record, the campaign runner service may abort the campaign record as well as the vehicle records and mark the campaign record as aborted. If, however, one or more vehicles in the VIN List have viewed the respective vehicle record and accepted the metadata or are downloading the update, campaign runner service will reject the request to cancel a campaign. When a campaign is canceled and a VIN in the list for it has multiple updates queued, campaign runner service may cancel all remaining updates queued for this particular VIN, providing that above conditions are met.

Vehicle responder service serves as the sole endpoint for a vehicle (e.g., 214) to communicate with. Each vehicle may have an onboard TCU 224. The vehicle responder service 208 may have an API endpoint exposed to a virtual private network (VPN) tunnel 230 which allows for a secure channel of communication. A VPN is a secure digital connection between two network nodes such as between the TCU 224 and vehicle responder service 208, that encrypts data across the nodes and masks IP addresses. TCU 224 may transmit a message to vehicle responder service 208 to check whether a pending update is available for the vehicle 214. TCU 224 can also transmit status of an on-going update for example, by providing the vehicle responder service 208 with an indication that an update is in-progress or complete.

In response to receiving a request from TCU 224, vehicle responder service 208 checks whether an update is available for that vehicle. The vehicle responder service 208 may check database 212 to check if an update is available for the that vehicle (e.g., if the VIN of a vehicle record matches that of the requesting vehicle). One or more updates may be available for a given vehicle, depending on if any update campaigns have been made active for that vehicle. In an example, when a vehicle has a pending update, the corresponding vehicle record may be placed in a first in first out (FIFO) data structure (e.g., a queue). When a vehicle polls the vehicle responder service 208 for an available update, 208 may check the queue for that vehicle to see if the queue holds any vehicle records, and if so, may pull the vehicle record from that queue. That vehicle record may include a UUID associated with the package to be downloaded to update that vehicle. Vehicle responder service 208 may generate a download network address (e.g., a pre-signed URL) and send this to the TCU 224 for the TCU to securely download that package (e.g., package 222 or a different package).

Upon downloading the package (e.g., package 222), TCU 224 may transmit to vehicle responder service 208 a final status of the update (e.g., success or fail). If an update is failed, the vehicle responder service 208 may cancel all queued updates for that vehicle 214. Vehicle responder service 208 may check and update campaign status of a campaign record in database 212 (e.g., campaign complete) when all vehicles in a campaign have reported a status for the update.

In some examples, a package 222 may include an indication to update the TCU 224, in addition to, or in alternative to, having images for the other vehicle compute devices 228. The TCU image may be generated by build server 220. The build server 220 may generate the TCU image as a delta image that represents a difference from a previous version of the TCU image to a new version of the TCU image. Build server 220 may automatically store this delta build to filesystem tree 210. Filesystem tree 210 may comprise an OSTree repository that stores each delta build in a traversable data structure. Filesystem tree 210 may comprise an API endpoint for a client (e.g., TCU 224) to access. In an example, release management 202 may include an indication of the targeted TCU version or targeted delta image in package 222. Upon downloading the package 222 and reading this indication, TCU 224 may request the one or more delta TCU build images 226 from file server 210 (e.g., by providing the current version and target version of the TCU image). In response, the filesystem tree 210 may traverse the internal file system to obtain one or more delta builds 226 for the TCU, and transmit the one or more delta TCU build images 226 to the TCU 224.

TCU 224 may transmit to vehicle responder service 208, vehicle software version information. This may include software part numbers associated with each updatable vehicle compute device 228 on vehicle 214. This information is collected by the TCU 224 and transmitted to vehicle responder service 208. Vehicle responder service 208 may store and tag this information with a unique vehicle record ID for retrieval purposes, which allows the OTA cloud application 218 to track all software changes that have historically occurred for each vehicle.

In an embodiment, all microservices 204, 206, 208 of OTA cloud application 218 access the same database 212 and data that is updated by one microservice is readily available to the other. Due to this feature, there additional inter-service communication is reduced or eliminated, thereby improving efficiency and speed of handling requests. Such a system leverages a combination of microservices, domain specific features, database management, and optimized communication routes, while providing the fleet of vehicles with the latest software enhancements and patches with improved scalability, reliability, and security over existing OTA systems.

FIG. 3 shows a flow diagram of a process 300 for providing OTA updates to a vehicle, according to an embodiment. The process 300 may be performed by processing logic that may comprise hardware (circuitry, dedicated logic, etc.), software (such as is run on a general purpose computer system or a dedicated machine), firmware, or a combination. The process 300 may be performed by a plurality of processors in a distributed architecture and/or a microservices architecture. Process 300 may be performed by an OTA cloud application as described in other sections.

At block 302, in response to receiving a first request over the network to upload a packaged computer program associated with a component of the vehicle, processing logic may transmit, over the network, an upload network address associated with a file server for uploading the packaged computer program to the file server. At block 304, processing logic stores, to a database, an association between the packaged computer program and a universally unique identifier (UUID).

Blocks 302 and 304 may be performed by a first service (e.g., a package manager service) of a microservices application. The first request may comprise a request from a client (e.g., release management) through an API endpoint of the first service. The first service may transmit the upload network address associated with the file server to the requesting client, and store the association between the UUID and the packaged computer program to the database. In such a manner, each package is uniquely identifiable with its own UUID. In an embodiment, the first service may validate each request by requiring that each package is uniquely named, a version is provided, as well as other information such as a hash value and file size. This information may be stored in the database in association with the respective package UUID. The upload network address may be a pre-signed single-use URL which may give the client access that would not otherwise be available, to upload to that file server 216. File server 216 may be a private file server that blocks access to users unless they are granted permission to upload or download from the file server. The OTA cloud application (and microservices thereof) may comprise security credentials specific to each file server that are used to create each pre-signed URL with limited permissions (e.g., single-use and/or a time limit).

At block 306, in response to receiving a second request that includes one or more vehicle identification numbers (VINs) associated with respective one or more vehicles that are targeted to update software to a specified UUID, processing logic stores one or more records that associates the one or more vehicle identification numbers (VINs) with the specified UUID to the database.

Block 306 may be performed by a second service (e.g., campaign runner service 206) of the microservices application. In an embodiment, storing the one or more records comprises storing a campaign record associating all of the one or more VINs to the UUID, and storing one or more vehicle records respectively associating each of the one or more VINs to the UUID. Further, the second service may store each of the one or more vehicle records to a respective FIFO data structure that is specific to each vehicle. In an embodiment, in response to the second service receiving a cancel request to cancel a specified campaign record, the second service may cancel the specified campaign record, in response to determining that none of the one or more vehicles associated with the specified campaign record has performed an update associated with the specified campaign record.

At block 308, in response to receiving over the network, a third request from a control unit of the vehicle, processing logic determines that the vehicle is associated with one of the one or more VINs stored in the database, and transmits to the vehicle, a download network address for the vehicle to use to download the packaged computer program from the file server.

Block 308 may be performed by a third service (e.g., vehicle responder service). In an embodiment, the third service pulls a respective one of the one or more vehicle records from the FIFO data structure and transmits to the vehicle, the download network address associated with the respective UUID in the respective one of the one or more vehicle records pulled from the FIFO data structure. For example, if the third service receives a request from a vehicle for an available update, the third service will read the FIFO data structure that is specific to that vehicle to pull the first-in vehicle record that is stored on that data structure, if one is present. The third service generates a download network address (e.g., a one-time use URL) that points at the package associated with the UUID named in that vehicle record. The vehicle uses that download network address to request the corresponding package from the file server.

Communication between the third service and the vehicle may be through a VPN connection. This VPN connection may be authenticated by the third service based on an encryption key associated with the control unit of the vehicle. For example, each TCU of each vehicle may have a unique ID that is used to generate a corresponding encryption key for that TCU, and then used by the third service to authenticate and allow each TCU to communicate over the dedicated VPN connection.

Figure 4:
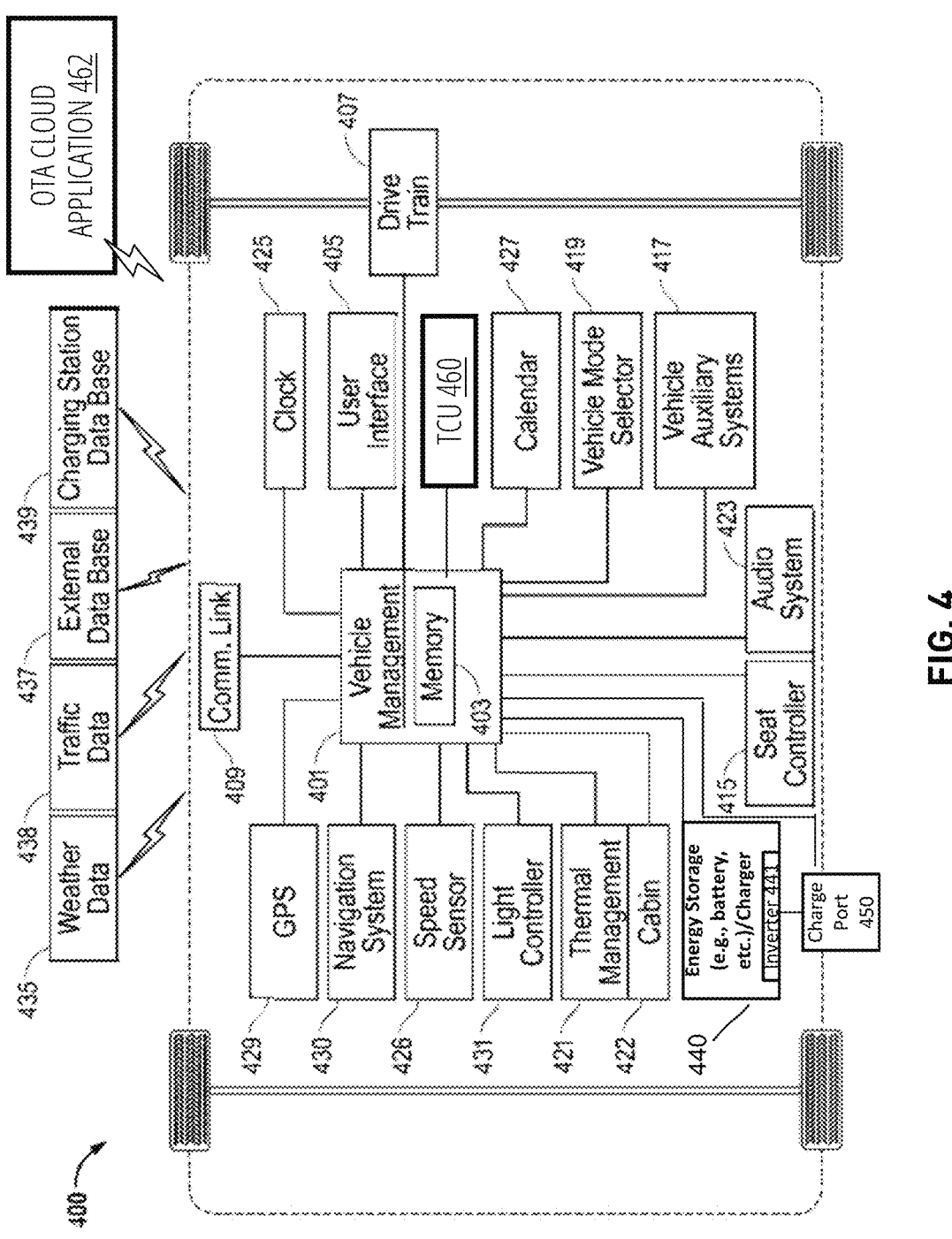
FIG. 4 is a high-level view of some embodiments of a vehicle, in accordance with an embodiment.

FIG. 4 is a high-level view of some embodiments of a vehicle 400, in accordance with an embodiment. Vehicle 400 can be an electric vehicle (EV), a vehicle utilizing an internal combustion engine (ICE), or a hybrid vehicle, where a hybrid vehicle utilizes multiple sources of propulsion including an electric drive system. Vehicle 400 includes a vehicle on-board system controller 401, also referred to herein as a vehicle management system, which is comprised of one or more processors (e.g., a central processing unit (CPU)). System controller 401 also includes memory 403, with memory 403 being comprised of EPROM, EEPROM, flash memory, RAM, solid state drive, hard disk drive, or any other type of memory or combination of memory types.

In some embodiments, vehicle 400 includes one or more internal networks by which system controller 401 interfaces and communicates with one or more internal subsystems of vehicle 400. System controller 401 can also use the one or more internal networks to transfer communications to and from external locations. In some embodiments, the one or more internal networks can be communicably coupled to one or more networks through a network interface. The network interface can provide for wired and/or wireless communication. When used in a local area networking environment (or a wide area networking environment), the network interface can include an Ethernet interface and the one or more internal networks includes an Ethernet communication network (e.g., an Ethernet Ring, etc.) with an Ethernet Port. Other possible embodiments use other communication devices. For example, in some embodiments vehicle 400 includes a modem for communicating across an internal network and/or with an external network.

In some embodiments, vehicle 400 includes a charging port 450 and one or more batteries (e.g., battery pack, etc.)/battery charger as an energy storage system 440 that provides power to portions of vehicle 400. The charging port 450 is used for providing voltage to vehicle 400 for charging the energy storage system 440 (e.g., charging batteries of batteries/charger by the use of, for example, an EVSE or other power source in a manner well-known in the art. The charging port 450 can be used to transfer power from a battery of the energy storage system 440 to an external location as part of a vehicle-to-grid power transfer. In some embodiments, charging port 450 includes a communication path for communications between the system controller 401 and the locations external to vehicle 400 such as, for example, the power source providing power (voltage) to vehicle 400 for charging batteries of the energy storage system 440 and a utility distributed energy resource management system (DERMS) or an electric utility company and its facilities.

In some embodiments, energy storage system 440 includes an inverter 441 that generates voltage for transfer to an electric power grid. In some embodiments, the inverter 441 converts DC voltage to AC voltage for transfer to the electric power grid. In some embodiments, the same inverter 441 (or a separate invertor) converts DC voltage to AC voltage for charging a battery of the energy storage system 440 or can provide DC to AC voltage conversion when providing power to an electrical power grid as part of a vehicle-to-grid operation.

In some embodiments, vehicle 100 includes a user interface 405 is coupled to vehicle management system 401. Interface 405 allows the driver, or a passenger, to interact with the vehicle management system, for example inputting data into the navigation system 430, altering the heating, ventilation and air conditioning (HVAC) system via the thermal management system 421, controlling the vehicle's entertainment system (e.g., radio, CD/DVD player, etc.), adjusting vehicle settings (e.g., seat positions, light controls, etc.), and/or otherwise altering the functionality of vehicle 400. In some embodiments, user interface 405 also includes means for the vehicle management system to provide information to the driver and/or passenger, information such as a navigation map or driving instructions (e.g., via the navigation system 430 and GPS system 429) as well as the operating performance of any of a variety of vehicle systems (e.g., battery pack charge level for an EV, fuel level for an ICE-based or hybrid vehicle, selected gear, current entertainment system settings such as volume level and selected track information, external light settings, current vehicle speed (e.g., via speed sensor 426), current HVAC settings such as cabin temperature and/or fan settings, etc.) via the thermal management system 421. Interface 405 may also be used to warn the driver of a vehicle condition (e.g., low battery charge level or low fuel level) and/or communicate an operating system malfunction (battery system not charging properly, low oil pressure for an ICE-based vehicle, low tire air pressure, etc.). Vehicle 400 can also include other features like an internal clock 425 and a calendar 427.

In some embodiments, user interface 405 includes one or more interfaces including, for example, a front dashboard display (e.g., a cockpit display, etc.), a touch-screen display (e.g., a pilot panel, etc.), as well as a combination of various other user interfaces such as push-button switches, capacitive controls, capacitive switches, slide or toggle switches, gauges, display screens, warning lights, audible warning signals, etc. It should be appreciated that if user interface 405 includes a graphical display, controller 401 may also include a graphical processing unit (GPU), with the GPU being either separate from or contained on the same chip set as the processor.

Vehicle 400 also includes a drive train 407 that can include an internal combustion engine, one or more motors, or a combination of both. The vehicle's drive system can be mechanically coupled to the front axle/wheels, the rear axle/wheels, or both, and may utilize any of a variety of transmission types (e.g., single speed, multi-speed) and differential types (e.g., open, locked, limited slip).

Drivers often alter various vehicle settings, either when they first enter the car or while driving, in order to vary the car to match their physical characteristics, their driving style and/or their environmental preferences. System controller 401 monitors various vehicle functions that the driver may use to enhance the fit of the car to their own physical characteristics, such as seat position (e.g., seat position, seat height, seatback incline, lumbar support, seat cushion angle and seat cushion length) using seat controller 415 and steering wheel position using an auxiliary vehicle system controller 417. In some embodiments, system controller 401 also can monitor a driving mode selector 419 which is used to control performance characteristics of the vehicle (e.g., economy, sport, normal). In some embodiments, system controller 401 can also monitor suspension characteristics using auxiliary vehicle system 417, assuming that the suspension is user adjustable. In some embodiments, system controller 401 also monitors those aspects of the vehicle which are often varied by the user in order to match his or her environmental preferences for the cabin 422, for example setting the thermostat temperature or the recirculation controls of the thermal management system 421 that uses an HVAC controller, and/or setting the radio station/volume level of the audio system using controller 423, and/or setting the lights, either internal lighting or external lighting, using light controller 431. Also, besides using user-input and on-board sensors, system controller 401 can also use data received from an external on-line source that is coupled to the controller via communication link 409 (using, for example, GSM, EDGE, UMTS, CDMA, DECT, WiFi, WiMax, etc.). For example, in some embodiments, system controller 401 can receive weather information using an on-line weather service 435 or an on-line data base 437, traffic data 438 for traffic conditions for the navigation system 430, charging station locations from a charging station database 439, etc. In some embodiments, communication link 409 comprises an Ethernet communication link with an Ethernet Port for external communications.

The system controller 401 can transfer information with the components described above over one or more internal networks, such as those, for example, described above. In some embodiments, the system controller 401 is communicably coupled to one or more of these components via an Ethernet communication network (e.g., an Ethernet Ring, etc.). The Ethernet communication network can be used to transfer other data such as data related to, but not limited to, one or more of a driver-assistance system, telematics, over-the-air updates, etc.

The vehicle may comprise a telematics control unit (TCU) 460 that is responsible for software and firmware updates to each of the updateable components of the vehicle (e.g., GPS 429, navigation system 430, speed sensor 426, light controller 431, thermal management 421, energy storage system 440, seat controller 415, audio system 423, vehicle aux systems 417, vehicle mode selector 419, calendar 427, user interface 405, clock 425, vehicle management 401, communications link 409, or other components not shown. TCU 460 may be integral to vehicle management 401 or separate.

TCU may communicate with OTA cloud application 462 through communication link 409, to send queries (e.g., polling for available updates), and to obtain packages from a file server (not shown in this figure). The TCU 460 may poll the OTA cloud application 462 to determine whether an update is available for that vehicle, and if so, obtain the download network address to download the corresponding programming package from a file server. In an embodiment, the OTA cloud application 462 is configured to handle such poll requests and lacks push functionality for performing software pushes to a vehicle. This no-push architecture provides additional security—a malicious attacker cannot take control of the system and push harmful software updates to vehicles.

In an embodiment, when a new vehicle is on-boarded to the OTA cloud application 462, a newly installed TCU 460 receives a VIN of the vehicle it is installed on. Once TCU receives this configuration it reaches out to another cloud entity for obtaining provisioned certificates issued by the dedicated PKI (Public Key Infrastructure). Once this process is completed the TCU 460 can create secure connections (e.g., VPNs) with the OTA cloud application 462 using the provisioned certificate. As described, the OTA cloud application 462 may comprise a microservices architecture with a dedicated service (e.g., vehicle responder service) that requires a dedicated vehicle VPN. All communication between the OTA cloud application 462 and the vehicle 608 is secured through this VPN and hence can be only established by a provisioned device such as TCU 460.

In order to communicate with the OTA cloud application 462, the TCU 460 may be required to provide the following information: 1. VIN—the VIN which is used by vehicle responder service of the OTA cloud application 462 to uniquely identify the vehicle; 2. Manufacturing Serial Number—a unique TCU serial number which is used by the vehicle responder service to uniquely identify the TCU.

The first time a vehicle checks in with the vehicle responder service, the service may create a "Last Seen Record" entry with the following fields: 1. Manufacturing Serial Number—the TCU's serial number; 2. VIN; 3. Last Seen Time—the time in UTC when the vehicle last contacted Vehicle Responder; and 4. First Seen Time—the time this combination of Serial Number and VIN first communicated with the server. This "Last Seen Record" helps track first time provisioning and TCU replacements. The TCU 460 may poll the OTA cloud application 462 (by periodic transmissions) at a set period of time, to query if there are any pending updates for that vehicle.

Figure 5:
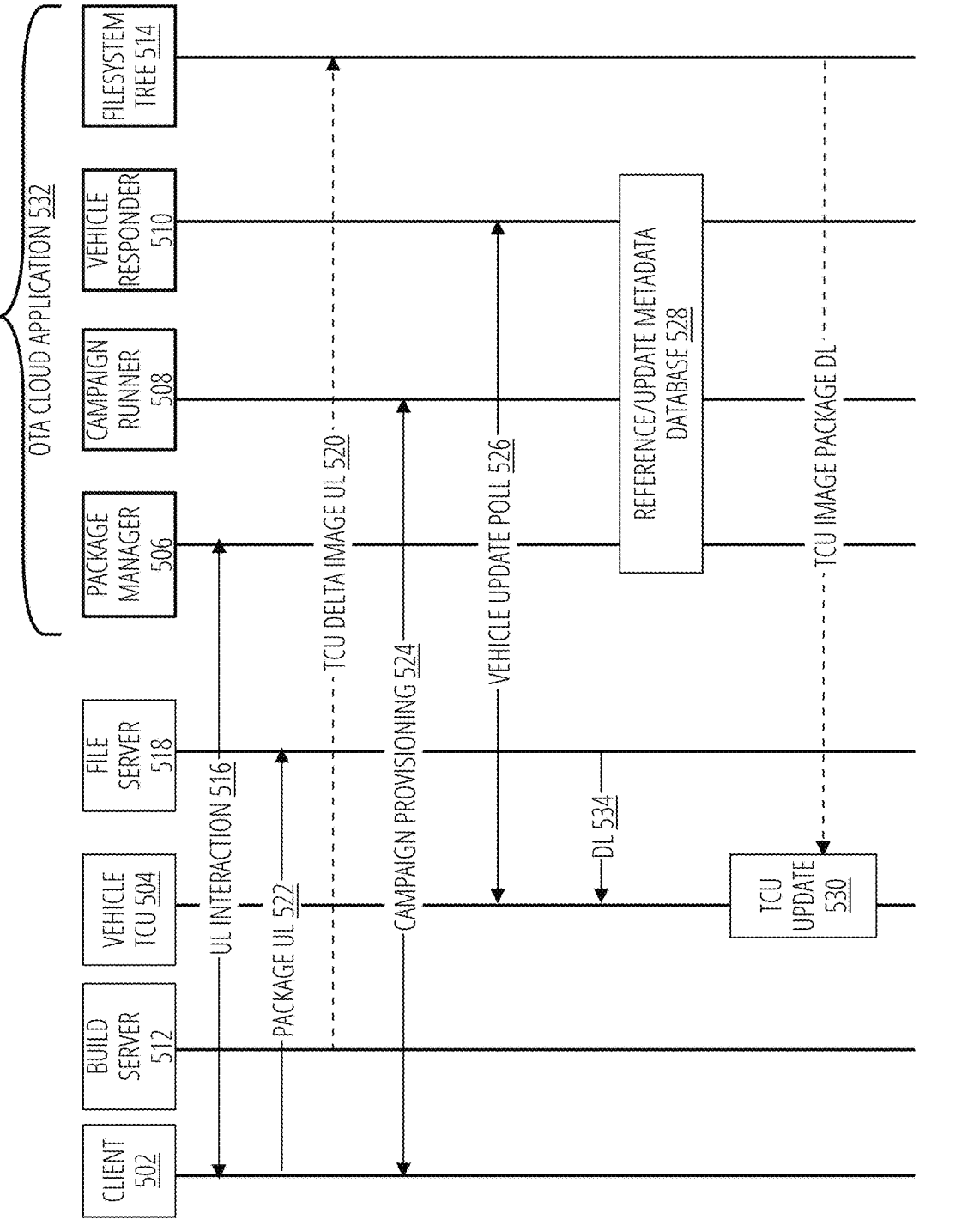
FIG. 5 shows a diagram of an example sequence of operations performed by an OTA cloud application, in accordance with an embodiment.

FIG. 5 shows a diagram of an example sequence of operations performed by an OTA cloud application, in accordance with an embodiment. The sequence shown is a single simplified example. It should be understood that various other sequences of operations may be performed, and with multiple vehicles and multiple campaign requests. The operations shown are meant to illustrate one example sequence of operations and is not an exhaustive list of operations that may be performed by an OTA cloud application, which may include any of the operations described in other sections.

At interaction 516, a client 502 may send a request to a package manager service 506 of OTA cloud application 532 to upload a computer programming package, which may include an image file (e.g., a binary file) for a vehicle to install on one of its onboard computing devices. The request may include information associated with the package to be uploaded (e.g., file name, file size, version number, hash value, etc.). The package manager service 506 validates that the required information is present and correct (e.g., file name must be unique, etc.), and in response to a valid request, generates and provides the client with an upload network address. Package manager service 506 may generate a UUID for that package, and store the UUID with the package metadata in a database.

At interaction 522, the client may transmit a request to upload the package at file server 518 by connecting to file server 518 with the upload network address. As described, the upload network address may be a pre-signed URL with limited specified usage (e.g., single-use), which improves control and security of uploading packages to the file server 518.

In some cases, client 502 may wish to update the software of the vehicle TCU 504, in addition to, or alternative to, updating the other computing devices on the vehicle. In such a case, client 502 may include additional metadata in the uploaded package which includes an indication that the TCU image is available for download at filesystem tree 514. Build server 512 may, at iteration 520, generate a TCU delta image update, and store this delta update to file system tree 514, which may be deployed as part of OTA cloud application 532.

Client 502 may, at interaction 524, transmit a request including one or more VINs and a UUID of a package, to campaign runner service 508. The request specifies one or more vehicles that are to update to the uploaded package associated with the specified UUID. In response, campaign runner service 508 validates that the VINs correspond to existing vehicles (e.g., by referencing a database), and validates that the UUID is matched to an uploaded package (e.g., by referencing the database). The campaign runner service 508 may, upon validation, initialize the campaign by generating and storing one or more records. The campaign runner service 508 may return a status to the client 502 to indicate that the update campaign has been initialized.

At interaction 526, vehicle TCU 504 may transmit a query to vehicle responder service 510 to determine whether a software update is available for that vehicle. When the vehicle responder service 510 receives the poll, the vehicle responder service may use the VIN provided by the TCU (in its query) to look for existence of vehicle records with that VIN that were created by the campaign runner service. If a record exists which denotes that the update is not finished, the vehicle responder service 510 creates a package download URL and provides the following metadata to the TCU: 1. Package Size—the overall package size in bytes as provided by the uploader; 2. Package SHA256 Sum—a SHA256 sum calculation of the package as provided by the uploader; 3. UUID—a unique identifier of this update; 4. Download URL—the one time URL generated for this package for this vehicle. As described in other sections, the download URL may be a pre-signed URL generated from the File Server which may be referred to as a simple storage service (S3) bucket. An S3 bucket is a cloud-based file folder or object storage. The vehicle responder service 510 will generate and provide a new URL to the TCU if the TCU performs another query at a later time. This allows the vehicle TCU 504 to manage the life cycle of downloading a package, independently and asynchronously from the vehicle responder service 510 and OTA cloud application 532.

At interaction 534, the vehicle TCU 504 uses the download URL to connect with and download the stored computer programming package from file server 518. Given that the vehicle can move, network connectivity may be interrupted from time to time. The vehicle TCU 504 may be configured to store download states during each download and use the stored state to resume interrupted downloads. Once the package is downloaded by vehicle TCU 504, vehicle TCU 504 may check the following: 1. Size Check—the size of the package downloaded is checked against the size provided by the file server, if there is a mismatch, this verification failure is reported back to vehicle responder service 510, and the update is terminated; 2. SHA256 Sum Check—the vehicle TCU 504 computes the SHA256 sum of the downloaded package and compares it with the one provided by the file server 518 and if there is a mismatch, this verification failure is reported back to vehicle responder service 510 and the update is terminated; 3. Signature Verification—the vehicle TCU 504 verifies that the downloaded package is signed by PKI, if the signature cannot be verified, this verification failure is reported back to 510 and the update is terminated. After these checks pass, the vehicle TCU 504 proceeds to extract the artifacts of the package and process them further (e.g., installs the package to the respective onboard computing device). Further, at operation 530, TCU checks the downloaded package for an indication to perform an update to the TCU itself. The indication may indicate whether or not the update is available, and/or a target version to update to, at filesystem tree 514. The filesystem tree may store delta updates of the TCU image. Each delta may comprise a difference between a current version and a past version. Thus, a TCU need not download its entire image from the filesystem tree 514. If the TCU is to update itself, it initiates a connection to the filesystem tree 514 (e.g., an OSTree repository) to download the one or more deltas required to reach the target version. This may include making one or more API calls to filesystem tree 514. Upon completion of downloading the package and the TCU deltas (if indicated in the package metadata), vehicle TCU 504 may provide a notification to a vehicle user (e.g., via Infotainment display screen or mobile application). On receiving consent from the vehicle user, the TCU may initiate and perform the update in the vehicle by updating the software or firmware of the onboard components of that vehicle.

Vehicle TCU 504 may transmit a status update to vehicle responder service 510 indicating whether the update for that vehicle is complete. Vehicle responder service 510 may mark a vehicle record as complete in response to any of the received statuses: 1. Download Failed—the vehicle failed to download the package (e.g., after exceeding a threshold number of retries); 2. Package Verification Failed—the size or hash value (e.g., SHA256 sum) did not match with the provided metadata; 3. Signature Verification Failed-signing of the package could not be verified; 4. Incorrect Package Format-package is corrupted and artifacts cannot be verified; 5. Installation Failed-TCU or onboard computing device failed to install the update; 6. Canceled—the update was canceled by a vehicle user or due to a previous update failing; 7. Install Success-package was successfully installed on all target ECUs. When multiple updates are queued for the same VIN and any status except 'Install Success' is received for the active update, the campaign runner service 508 or vehicle responder service 510 may move all the vehicle records in queue to a canceled state. Along with all these status updates, the vehicle TCU 504 may transmit to vehicle responder service 510, vehicle version information (e.g., a version number) which is stored in the database with the unique vehicle record, to reference and to maintain historical records of each device update on a given vehicle.

At various times as described in other sections, each of the microservices 506, 508, 510 may, at operation 528, reference and/or update metadata database. For example, package manager service 506 may generate and update entries describing package UUID and related metadata. Campaign runner service may generate and update campaign records and vehicle records in response to deployment requests. Further, vehicle responder service 510 may update vehicle records and campaign records based on status and software versioning received from vehicles.

Figure 6:
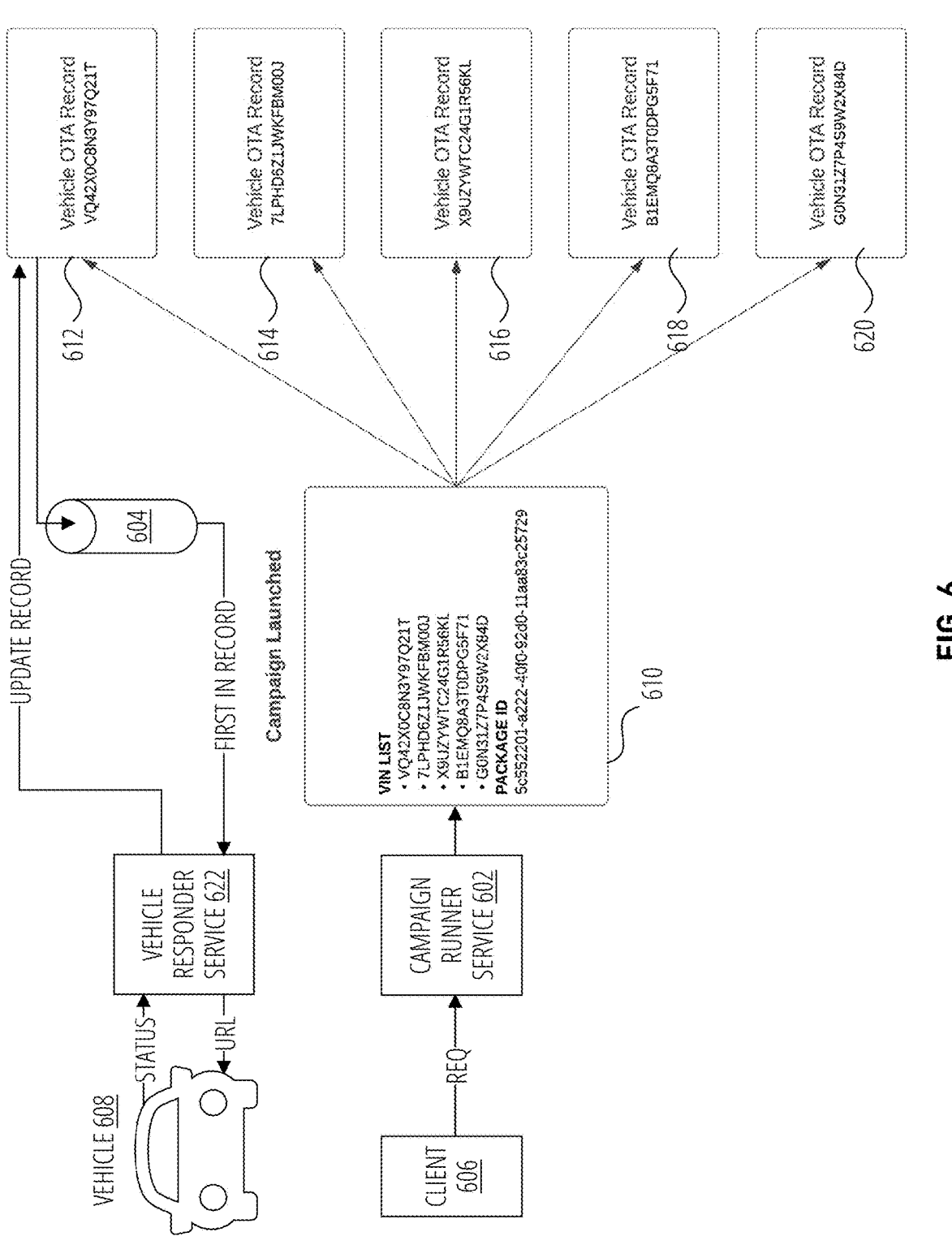
FIG. 6 illustrates an example of an OTA cloud application that performs tracking of an update campaign, in accordance with an embodiment.

FIG. 6 illustrates an example of an OTA cloud application that performs tracking of an update campaign, in accordance with an embodiment.

A client 606 transmits a request to campaign runner service 602 to launch a campaign update. The client 606 sends the request and typically includes a plurality of vehicles which are targeted for a given update. OTA cloud application tracks the status of each individual vehicle with respect to each update campaign. Furthermore, when all the vehicles in an update campaign have finished the requested update, the OTA cloud application marks that entire update campaign as complete. To be able to track each update in a campaign separately, campaign runner service 602 may perform campaign update unpacking as shown in FIG. 6.

In the update campaign request, client 606 transmits a list of VINs and a package ID (which may also be referred to as a package UUID). The campaign runner service 602 may generate a campaign record 610 with the requested information together, and then unpack this campaign record into individual vehicle records (612, 614, 616, 618, 620). These records are stored in a database (e.g., as described with respect to the other figures) for each of the microservices of the OTA cloud application to reference and/or update.

Each of these vehicle records reflect the current status of this campaign update with respect to a specific vehicle (indicated by the VIN of that vehicle record). Each VIN in the VIN list is unpacked into a separate vehicle record, and each vehicle record may also include additional metadata such as the package ID, VIN, Update Status, Deploy Time, etc. This is the vehicle record (e.g., database entry) is exposed to a polling vehicle 608 upon request for available updates.

Campaign runner service 602 may, when handling an update campaign request, place each vehicle record associated with a campaign record onto a respective FIFO vehicle data structure 604. That vehicle data structure 604 represents the available packaged software updates for a vehicle and the queued order in which the vehicle is to perform these updates. Campaign runner service 602 maintains this queue at a vehicle record level while each campaign record (e.g., campaign record 610) maintains status of each individual update campaign.

A user (e.g., through client 606) can launch multiple campaigns with an arbitrary number of VINs listed. In response to receiving a request to launch an update campaign, the campaign runner service 602 will create individual vehicle records (e.g., 612, 614, 616, 618, 620) with optional metadata. These vehicle records and the campaign record are stored in a database (e.g., as described with respect to other figures). When polled, vehicle responder service 622 pulls a single vehicle record from vehicle data structure 604 and provides the download network address for the package UUID of that vehicle record to the vehicle 608.

Once the vehicle downloads the package and installs its content, the vehicle responds with the final update status. In response, the vehicle responder service 622 may mark that vehicle record (e.g., vehicle record 612) as finished and removes that record from the vehicle data structure 604. In such a manner, the OTA cloud application may search the database of vehicle records by deploy time and filter those results by the VIN, to effectively create an update queue for the filtered VIN without maintaining additional metadata. In addition, vehicle responder service 622 may receive from the vehicle 608, updated vehicle software version information and update associated record (e.g., 612) upon completion of an update. Vehicle responder service 622 may create or update a record with a last-seen time of when the vehicle 608 communicated this software version information to the OTA cloud system. The OTA cloud application can provide this information to a client upon request.

Figure 7:
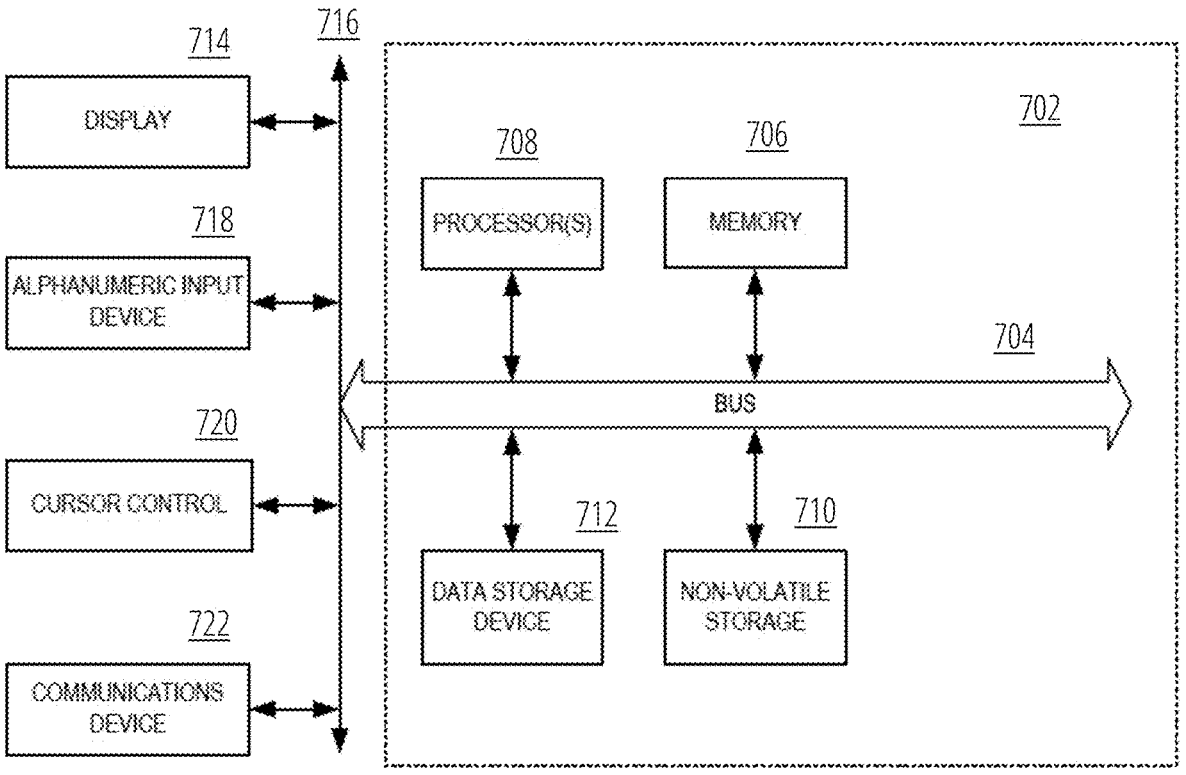
FIG. 7 is an example of a computer system that may perform operations described, in accordance with an embodiment.

FIG. 7 is an example embodiment of a computer system that may perform operations described, in accordance with an embodiment. For example, one or more computer systems as illustrated in FIG. 7 may be used by an OTA cloud application as described in other sections. It will be apparent to those of ordinary skill in the art, however that other alternative systems of various system architectures may also be used.

The computer system 702 illustrated in FIG. 7 includes a bus or other internal communication means 704 for communicating information, and one or more processors 708 coupled to the bus 704 for processing information. The system further comprises a random access memory (RAM) or other volatile storage device 706 (referred to as memory), coupled to bus 704 for storing information and instructions to be executed by processor 708. Main memory 706 also may be used for storing temporary variables or other intermediate information during execution of instructions by processor 708. The system also comprises a read only memory (ROM), non-volatile storage, and/or static storage device 710 coupled to bus 704 for storing static information and instructions for processor 708, and a data storage device 712 such as a magnetic disk or optical disk and its corresponding disk drive. Data storage device 712 is coupled to bus 704 for storing information and instructions.

The system may further be coupled to a display device 714, such as a light emitting diode (LED) display, or a liquid crystal display (LCD) coupled to bus 704 through bus 716 for displaying information to a computer user. An alphanumeric input device 718, including alphanumeric and other keys, may also be coupled to bus 704 through bus 716 for communicating information and command selections to processor 708. An additional user input device is cursor control device 720, such as a touchpad, mouse, a trackball, stylus, or cursor direction keys coupled to bus 704 through bus 716 for communicating direction information and command selections to processor 708, and for controlling cursor movement on display device 714.

Another device, which may optionally be coupled to computer system 702, is a communication device 722 for accessing other nodes of a distributed system via a network. The communication device 722 may include any of a number of commercially available networking peripheral devices such as those used for coupling to an Ethernet, token ring, Internet, or wide area network. The communication device 722 may further be a null-modem connection, or any other mechanism that provides connectivity between the computer system 702 and the outside world. Note that any or all of the components of this system illustrated in FIG. 7 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 706, mass storage device 712, or other storage medium locally or remotely accessible to processor 708.

It will be apparent to those of ordinary skill in the art that the system, method, and process described herein can be implemented as software stored in main memory 706 or read only memory and executed by processor 708. This control logic or software may also be resident on an article of manufacture comprising a computer readable medium having computer readable program code embodied therein and being readable by the mass storage device 712 and for causing the processor 708 to operate in accordance with the methods and teachings herein.

The embodiments discussed herein may also be embodied in a handheld or portable device containing a subset of the computer hardware components described above. For example, the handheld device may be configured to contain only the bus 704, the processor 708, and memory 706 and/or 712. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 708, a data storage device 712, a bus 704, and memory 706, and only rudimentary communications mechanisms, such as a small touchscreen that permits the user to communicate in a basic manner with the device. In general, the more special purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A system, in communication with a network, for performing programming updates to a vehicle comprising:

a memory; and a processor coupled to the memory, wherein the processor is configured to perform operations comprising:

in response to receiving a first request over the network to upload a packaged computer program associated with a component of the vehicle, transmitting, over the network, an upload network address associated with a file server for uploading the packaged computer program to the file server;

storing, to a database, an association between the packaged computer program and a universally unique identifier (UUID);

in response to receiving a second request that includes one or more vehicle identification numbers (VINs) associated with respective one or more vehicles that are targeted to update software to a specified UUID, storing one or more records that associates the one or more vehicle identification numbers (VINs) with the specified UUID to the database; and in response to receiving over the network, a third request from a control unit of the vehicle, determining that the vehicle is associated with one of the one or more VINs stored in the database, and transmitting to the vehicle, a download network address for the vehicle to use to download the packaged computer program from the file server.

2. The system of claim 1, wherein the packaged computer program comprises an indication to the control unit to obtain a complete computer program for updating programming of the control unit, and wherein the system includes an image server that receives, from a build server, a delta computer program of the control unit of the vehicle, stores the delta computer program in a filesystem tree, and in response to a request from the control unit of the vehicle, transmits the complete computer program which includes the delta computer program, to the control unit of the vehicle for updating programming of the control unit.

3. The system of claim 1, wherein the system comprises a microservices application comprising a plurality of services that operate asynchronously, including a first service to receive the first request, transmit the upload network address associated with the file server, and store the association between the UUID and the packaged computer program to the database.

4. The system of claim 3, wherein the microservices application comprises a second service to receive the second request including the one or more VINs, and store the one or more records that associates the one or more VINs with the specified UUID to the database, wherein storing the one or more records comprises storing a campaign record associating all of the one or more VINs to the UUID, and storing one or more vehicle records respectively associating each of the one or more VINs to the UUID.

5. The system of claim 4, wherein the operations of the system further comprise:

in response to the second service receiving a cancel request to cancel a specified campaign record, canceling the specified campaign record in response to determining that none of the one or more vehicles associated with the specified campaign record has performed an update associated with the specified campaign record.

6. The system of claim 4, wherein the microservices application comprises a third service to receive the third request from the control unit of the vehicle, reference the database to determine whether the vehicle is associated with the one or more VINs stored in the database, and transmit to the vehicle, the download network address for the vehicle to use to download the packaged computer program from the file server.

7. The system of claim 6, wherein the second service stores each of the one or more vehicle records to a respective first in first out (FIFO) data structure, and the third service pulls a respective one of the one or more vehicle records from the FIFO data structure and transmits to the vehicle, the download network address associated with the respective UUID in the respective one of the one or more vehicle records pulled from the FIFO data structure.

8. The system of claim 6, wherein the third service receives the third request through a virtual private network (VPN) connection that is authenticated by the third service based on an encryption key associated with the control unit of the vehicle.

9. The system of claim 3, wherein the first request further comprises an upload region, and wherein the first service provides the upload network address associated with the file server that is located in the upload region.

10. The system of claim 3, wherein the first request further comprises a chunk parameter to divide the packaged computer program into a plurality of chunks, and the first service transmits a plurality of upload network addresses for each of the plurality of chunks.

11. A method performed by a processing device in communication with a network, for performing programming updates to a vehicle, the method comprising:

in response to receiving a first request over the network to upload a packaged computer program associated with a component of the vehicle, transmitting, over the network, an upload network address associated with a file server for uploading the packaged computer program to the file server;

storing, to a database, an association between the packaged computer program and a universally unique identifier (UUID);

in response to receiving a second request that includes one or more vehicle identification numbers (VINs) associated with respective one or more vehicles that are targeted to update software to a specified UUID, storing one or more records that associates the one or more vehicle identification numbers (VINs) with the specified UUID to the database;

in response to receiving over the network, a third request from a control unit of the vehicle, determining that the vehicle is associated with one of the one or more VINs stored in the database, and transmitting to the vehicle, a download network address for the vehicle to use to download the packaged computer program from the file server.

12. The method of claim 11, wherein the packaged computer program comprises an indication to the control unit to obtain a complete computer program for updating programming of the control unit, and wherein the system includes an image server that receives, from a build server, a delta computer program of the control unit of the vehicle, stores the delta computer program in a filesystem tree, and in response to a request from the control unit of the vehicle, transmits the complete computer program which includes the delta computer program, to the control unit of the vehicle for updating programming of the control unit.

13. The method of claim 11, wherein the system comprises a microservices application comprising a plurality of services that operate asynchronously, including a first service to receive the first request, transmit the upload network address associated with the file server, and store the association between the UUID and the packaged computer program to the database.

14. The method of claim 13, wherein the microservices application comprises a second service to receive the second request including the one or more VINs, and store the one or more records that associates the one or more VINs with the specified UUID to the database, wherein storing the one or more records comprises storing a campaign record associating all of the one or more VINs to the UUID, and storing one or more vehicle records respectively associating each of the one or more VINs to the UUID.

15. The method of claim 14, further comprising:

in response to the second service receiving a cancel request to cancel a specified campaign record, canceling the specified campaign record in response to determining that none of the one or more vehicles associated with the specified campaign record has performed an update associated with the specified campaign record.

16. A non-transitory computer readable storage medium storing instructions, which when executed by a computer processing system that is in communication with a network, causes the computer processing system to perform operations comprising:

in response to receiving a first request over the network to upload a packaged computer program associated with a component of the vehicle, transmitting, over the network, an upload network address associated with a file server for uploading the packaged computer program to the file server;

storing, to a database, an association between the packaged computer program and a universally unique identifier (UUID);

in response to receiving a second request that includes one or more vehicle identification numbers (VINs) associated with respective one or more vehicles that are targeted to update software to a specified UUID, storing one or more records that associates the one or more vehicle identification numbers (VINs) with the specified UUID to the database;

in response to receiving over the network, a third request from a control unit of the vehicle, determining that the vehicle is associated with one of the one or more VINs stored in the database, and transmitting to the vehicle, a download network address for the vehicle to use to download the packaged computer program from the file server.

17. The computer-readable storage medium of claim 16, wherein the packaged computer program comprises an indication to the control unit to obtain a complete computer program for updating programming of the control unit, and wherein the system includes an image server that receives, from a build server, a delta computer program of the control unit of the vehicle, stores the delta computer program in a filesystem tree, and in response to a request from the control unit of the vehicle, transmits the complete computer program which includes the delta computer program, to the control unit of the vehicle for updating programming of the control unit.

18. The computer-readable storage medium of claim 16, wherein the system comprises a microservices application comprising a plurality of services that operate asynchronously, including a first service to receive the first request, transmit the upload network address associated with the file server, and store the association between the UUID and the packaged computer program to the database.

19. The computer-readable storage medium of claim 18, wherein the microservices application comprises a second service to receive the second request include the one or more VINs, and store the one or more records that associates the one or more VINs with the specified UUID to the database, wherein store the one or more records comprises storing a campaign record associating all of the one or more VINs to the UUID, and storing one or more vehicle records respectively associating each of the one or more VINs to the UUID.

20. The computer-readable storage medium of claim 19, wherein the instructions further configure the computer processing system to:

in response to the second service receive a cancel request to cancel a specified campaign record, cancel the specified campaign record in response to determining that none of the one or more vehicles associated with the specified campaign record has performed an update associated with the specified campaign record.

*    *    *    *    *